United States Patent [19]

Barber, Jr. et al.

[11] 4,201,107

[45] May 6, 1980

[54] AUDIO POWER PERCUSSION PICKUPS

[76] Inventors: Harold G. Barber, Jr., 2136 Paddock Rd., Levittown, N.Y. 11783; Charles L. Raimond, 142 Mariners Way, Copiague, N.Y. 11726

[21] Appl. No.: 917,321

[22] Filed: Jun. 19, 1978

[51] Int. Cl.[2] .......... H04M 1/04; F16F 15/04; H04R 1/28

[52] U.S. Cl. .......... 84/1.14; 84/DIG. 12; 179/1 M

[58] Field of Search .......... 84/1.14, 1.15, DIG. 12; 179/1 M, 146 R, 147, 179, 180, 146, 147, 148, 149, 150, 151, 152, 153, 154

[56] References Cited

U.S. PATENT DOCUMENTS

| | | | |
|---|---|---|---|
| 2,521,043 | 9/1950 | Citso | 179/148 F |
| 3,229,021 | 1/1966 | Baschet | 84/1.14 |
| 3,509,264 | 4/1970 | Green | 84/1.15 |
| 3,551,580 | 12/1970 | Glenn et al. | 84/1.14 |
| 3,553,339 | 1/1971 | Domingnez | 84/1.15 |
| 3,653,625 | 4/1972 | Plice | 179/147 |
| 3,665,490 | 5/1972 | Oskar | 179/146 R |
| 4,113,999 | 9/1978 | Swinehart | 179/180 |
| 4,127,751 | 11/1978 | Kinoshita | 179/180 |
| 4,151,378 | 4/1979 | Watson | 179/179 |

*Primary Examiner*—J. V. Truhe
*Assistant Examiner*—Forester W. Isen
*Attorney, Agent, or Firm*—Charles E. Temko

[57] ABSTRACT

A system of audio pickups particularly adapted for incorporation in percussion type instruments. The system employs powered rather than the usual dynamic pickups which are mounted directly upon the body of the percussion instrument, e.g. a drum, using a plastic foam insulative mounting which absorbs the direct transmission of vibration from the instrument, as contrasted with the reception of sound waves. In the case of pickups for receiving sound from the usual high-hat cymbals and snare drums, the pickups are mounted upon a common elongated bar which positions the pickups in an area for proper sound reception.

4 Claims, 5 Drawing Figures

FIG. 1
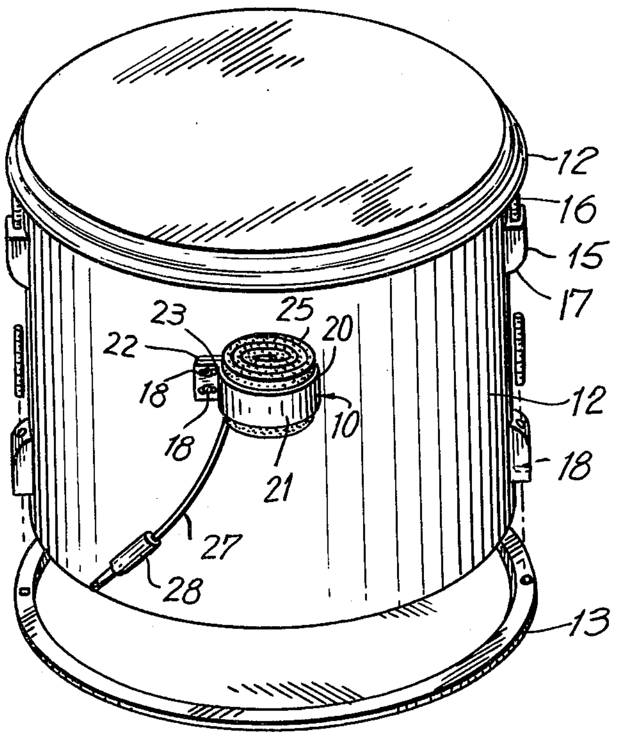
FIG. 2
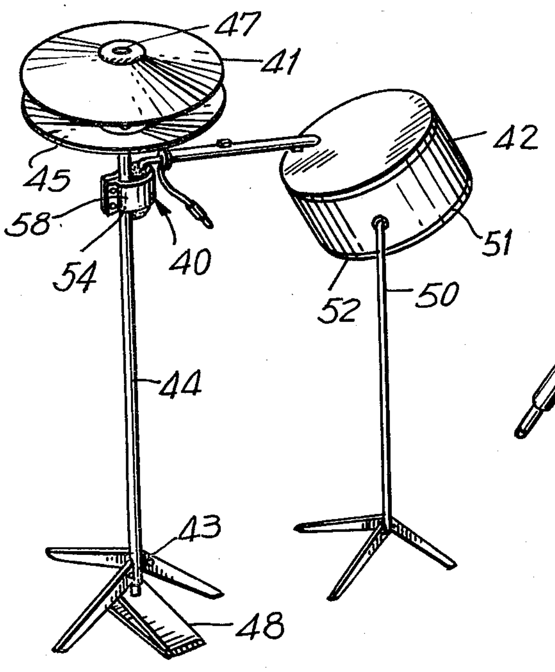
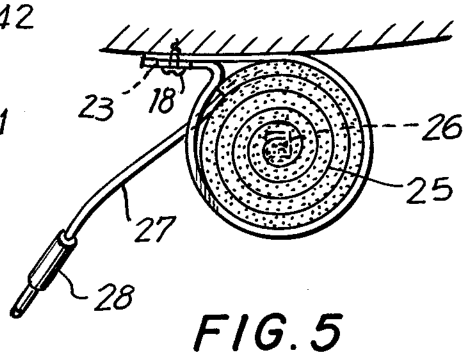
FIG. 5

AUDIO POWER PERCUSSION PICKUPS

BACKGROUND OF THE INVENTION

This invention relates generally to the field of musical amplification systems, and more particularly to an improved microphone or pickup system particularly adapted for use with drums and similar percussion instruments. Devices of this general type are known in the art, and the invention lies in specific constructional details of the disclosed embodiments which permit improved fidelity of sound reproduction, and absence of overloading and distortion, convenient manual assembly and disassembly, and lowered cost of production.

It is known in the art to mount microphones or pickup devices directly upon a percussion instrument, such as a vibrating bar or resonator so that tuned vibrations are directly transmitted thereto, as illustrated in U.S. Pat. No. to Baschet, 3,229,021 of Jan. 16, 1966. It is also known to mount pickup devices upon a vibrating drum head as illustrated, for example, in U.S. Pat. No. to Green, 3,509,264 of Apr. 28, 1970. In the case of the former construction, a separate pickup is required for each distinct tone, and the sound waves and tuned frequency of the structure upon which the pickup is mounted are the same. In the case of the latter construction, this is also true, but the tonal quality of the drum head tends to be destroyed by the fact that the frequency overtones of the vibrating drum head are not necessarily the same as the signal output of the pickup owing to the influence of vibrations imparted by the structure of the drum body.

Another problem incident to the installation of pickups on percussion instruments has been the tendency to overload the associated amplifier during the playing of passages of massive volume. Most pickup devices employed are of dynamic type or variable reluctance type, and the problem has been only partially solved by the provision of feedback circuitry to control resultant distortion. An example of this type of circuitry is found in U.S. Pat. No. to Jesperson, 3,649,737 of Mar. 14, 1972.

SUMMARY OF THE INVENTION

Briefly stated, the invention contemplates the provision of an improved construction of the class described in which the pickup device is of a powered type, widely used in the tape recorder art which is thereby limited with respect to maximum output. The pickup device is mounted upon the body of the percussion instrument using a synthetic resinous foam insulator which absorbs the transmitted vibrations of the instrument, and allows the pickup to be affected only by sound waves produced by the instrument during playing, thereby assuring a degree of fidelity equal or superior to that available when using independent microphones positioned in the area of the instrument, as is the case in a recording studio. In the case of the usual group of drums in an installation used by a single drummer, including a foot operated "high-hat" cymbal and snare drum, the cymbal is provided with a bar-like bracket which mounts pickups for the snare drum and the cymbal, which place the pickup devices in an area adjacent the drum head of the cymbal, and the lower of the cymbal pair. In these installations, the bracket is partially enclosed in insulating foam to isolate it from the cymbal structure upon which it is mounted.

BRIEF DESCRIPTION OF THE DRAWING

In the drawing, to which reference will be made in the specification, similar references characters have been employed to designate corresponding parts throughout the several views.

FIG. 1 is a perspective view of a first embodiment of the invention.

FIG. 2 is a perspective view of a second embodiment of the invention.

FIG. 5 is a top plan view as seen from the upper portion of FIG. 1.

DETAILED DESCRIPTION OF THE DISCLOSED EMBODIMENTS

Figure 3:
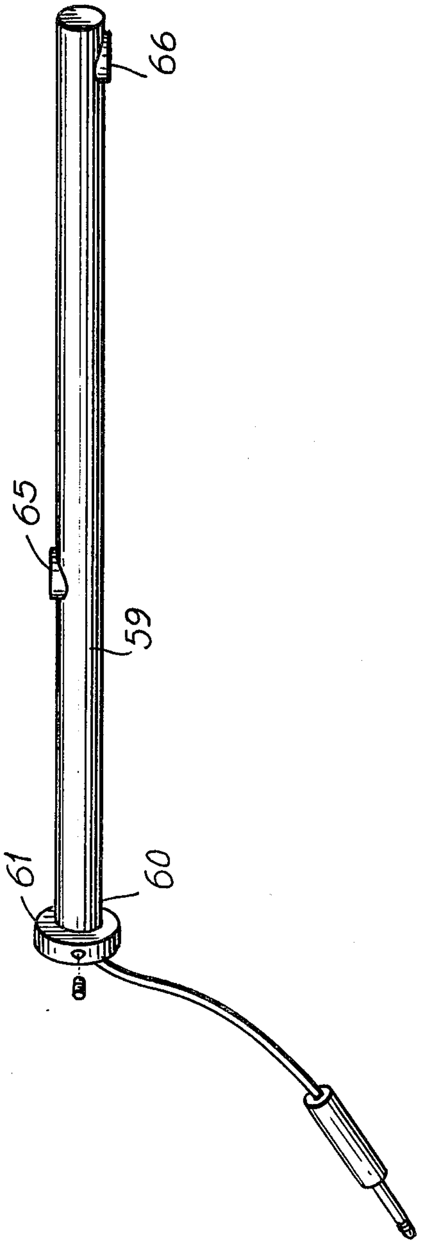
FIG. 3 is a view in perspective corresponding to the upper right hand portion of FIG. 2, showing a part of the structure in detached condition.
Figure 4:
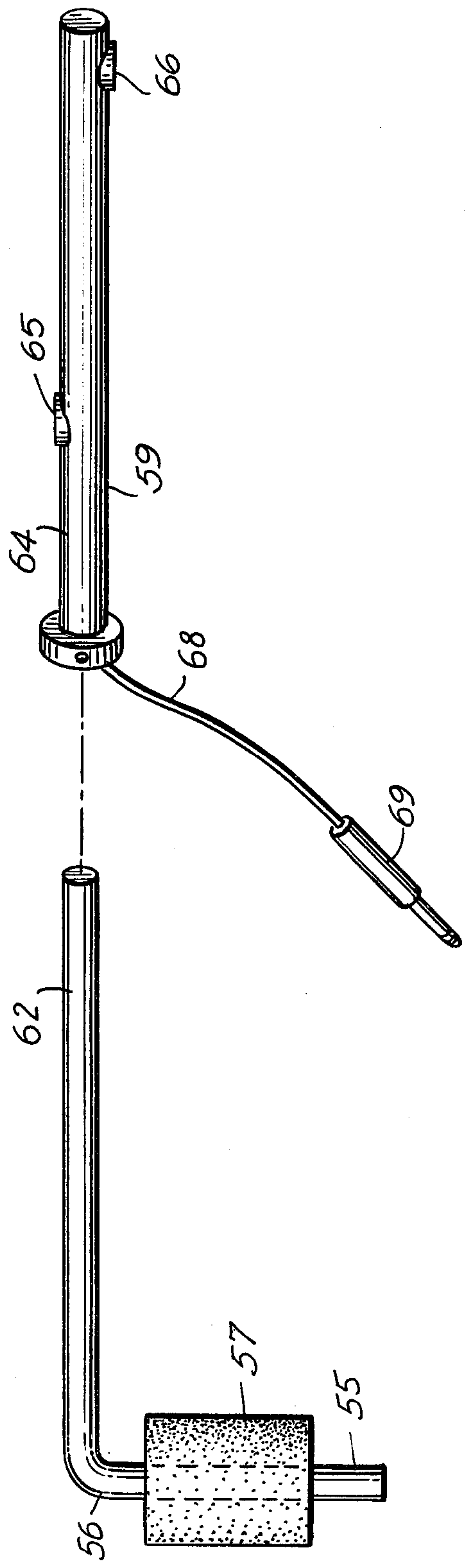
FIG. 4 is an assembled perspective view of an alternate form of the second embodiment.

In accordance with the first embodiment of the invention, generally indicated by reference character 10, reference character 11 designates a conventional tom-tom drum of conventional type, including a cylindrical shell 12 and upper and lower drum heads 12 and 13, respectively. The drum heads are secured to the shell by clamping elements 15 well known in the art, including tensioning screws 16 which engage clamp bodies 17 secured to the side of the shell 12 by mounting screws 18.

A pickup element 20 is secured to the shell 12 by screws 18, and includes either a metal or synthetic resinous mounting strap 21, the abutted terminals 22 of which are provided with slots 23 for engagement by the screws 18. The strap 21 defines a generally cylindrical opening in which an isolating member 25 is partially compressed. The member 25 is preferably formed by coiling a flat strip of synthetic resinous foam, although natural rubber may also be used, if desired. Disposed within the convolutions of the foam is a pickup 26 having a connecting cord 27 and plug 28 leading to an interconnection (not shown) with known mixing and amplification devices, the details of which form no part of the present disclosure. As mentioned supra, the pickups are of a powered type, and provide an output signal by varying the resistance on a current supplied by the amplifier, thereby preventing overloading and corresponding distortion. When, as installed in the preferred manner in which the pickup is disposed within the shell 12, the lower drum head 14 is preferably removed, or a blanket or other damping device is incorporated into the drum to eliminate unwanted reverberation.

In the second embodiment, generally indicated by reference character 40, a special mounting is provided for use in conjunction with floor operated high-hat cymbals 41 and a snare drum 42. The cymbals 41 are conventional, and include a floor stand 43 supporting a hollow vertically oriented tube 44 and lower cymbal 45. The upper cymbal is mounted on a shaft 47 connected to a foot pedal 48, again, in well known manner. The snare drum 42 is mounted on a conventional stand 50 including a drum engaging member 51 which supports the lower rim 52 of the drum.

The second embodiment 40 includes mounting structure 54 including an L-shaped mounting bracket 55, a vertical leg 56 of which is provided with an insulating member 57 disposed within a clamp 58. A hollow sleeve 59 is provided at a first end 60 with a collar 61 having a set screw which bears upon the horizontal leg 62, whereby the sleeve 59 may be moved inwardly or outwardly as required. The outer surface 64 of the sleeve 59 mounts first and second pickups, 65 and 66, respectively, which may be wired in parallel to use a common connecting cord 68 and plug 69. As seen in FIG. 2, the pickups are preferably adjusted such that the first pickup 65 is disposed immediately below the lower cymbal 45, and the second pickup 66 overlies the upper edge of the snare drum 42. It will be observed that both microphones are insulated from vibration with respect to the instruments which produce the sound waves which form the respective outputs of the pickups.

When the various drums are disassembled between performances, those pickups which are directly associated with the drums may be left in position, to be protected within the enclosure of the cylindrical shell. The second embodiment can be disconnected from the high-hat cymbal by merely removing the hollow sleeve 59, and allowing the L-shaped bracket 56 to remain in place. A subsequent set-up of the equipment requires only replacement of the sleeve 59 and the interconnection of the previously disconnected plugs 28 and 69. Since the pickups are constantly protected by the foam isolation members, the likelihood of damage to the same is remote.

We wish it to be understood that we do not consider the invention limited to the precise details of structure shown and set forth in this specification, for obvious modifications will occur to those skilled in the art to which the invention pertains.

We claim:

1. Improved audio pickup structure for musical instruments comprising: a clamping means in the form of a strap defining a generally cylindrically shaped opening, said strap including a pair of mutually abutted ends defining congruent slots for the reception of mounting screw means, a foam coil strip vibration absorbing members disposed within said cylindrically shaped opening, and a pickup substantially enclosed and supported by said vibration absorbing means; whereby upon the mounting of said clamping means upon a musical instrument, said pickup is substantially insulated from the effects of mechanical vibrations emanating from said instrument, and is responsive to generated sound waves produced by said instrument.

2. Structure in accordance with claim 1, further comprising an L-shaped bracket having a first leg projecting through and supported by said vibration absorbing member, and a second leg extending laterally outwardly substantially at right angles thereto; a cylindrical sleeve slidably disposed upon said second leg and at least one pickup carried by said sleeve.

3. Structure in accordance with claim 2, further comprising means for locking the position of said sleeve upon said second leg.

4. Structure in accordance with claim 2, in combination with a floor operated cymbal having a vertical hollow shaft, and a juxtaposed floor-supported snare drum, said first leg of said L-shaped bracket being secured to said vertical shaft of said cymbal, said cylindrical sleeve having first and second pickups thereon, said first pickup being located in the area of said cymbal, and said second pickup being located in an area immediately above said snare drum.

* * * * *